US008966480B2

(12) United States Patent  
Iwamatsu et al.

(10) Patent No.: US 8,966,480 B2  
(45) Date of Patent: Feb. 24, 2015

(54) SYSTEM FOR MIGRATING A VIRTUAL MACHINE BETWEEN COMPUTERS

(75) Inventors: Noboru Iwamatsu, Kawasaki (JP); Naoki Nishiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 204 days.

(21) Appl. No.: 13/431,017

(22) Filed: Mar. 27, 2012

(65) Prior Publication Data

US 2012/0254866 A1    Oct. 4, 2012

(30) Foreign Application Priority Data

Mar. 31, 2011  (JP) .................................. 2011-079786

(51) Int. Cl.
```
G06F 9/455      (2006.01)
G06F 9/46       (2006.01)
G06F 3/00       (2006.01)
G06F 13/12      (2006.01)
G06F 3/06       (2006.01)
G06F 11/20      (2006.01)
G06F 9/48       (2006.01)
```

(52) U.S. Cl.
CPC .......... *G06F 9/45558* (2013.01); *G06F 13/122* (2013.01); *G06F 3/061* (2013.01); *G06F 9/45533* (2013.01); *G06F 11/2017* (2013.01); *G06F 9/4856* (2013.01)
USPC .............................................. 718/1; 718/108

(58) Field of Classification Search
CPC ... G06F 9/4856; G06F 3/061; G06F 11/2017; G06F 13/122; G06F 9/45533; G06F 9/45558
See application file for complete search history.

(56) References Cited

U.S. PATENT DOCUMENTS

| 2008/0040526 | A1  |  2/2008 | Suzuki et al. |
| 2009/0119684 | A1* |  5/2009 | Mahalingam et al. ........ 719/324 |
| 2009/0198862 | A1* |  8/2009 | Okitsu et al. ................. 710/316 |
| 2009/0235249 | A1  |  9/2009 | Kobayashi et al. |
| 2012/0331212 | A1* | 12/2012 | Batish et al. ................. 711/103 |

FOREIGN PATENT DOCUMENTS

| JP | 2008-46722 | 2/2008 |
| JP | 2009-181418 | 8/2009 |
| JP | 2009-217608 | 9/2009 |
| JP | 2010-39685 | 2/2010 |
| JP | 2010-257209 | 11/2010 |
| WO | WO2010/116402 | 10/2010 |

OTHER PUBLICATIONS

Intel® Virtualization Technology for Directed IO Architecture Specification Rev 1.2, Feb. 2011.
Japanese Office Action issued Oct. 14, 2014 for corresponding Japanese Patent Application No. 2011-079786.

* cited by examiner

*Primary Examiner* — Camquy Truong
(74) *Attorney, Agent, or Firm* — Staas & Halsey LLP (57) ABSTRACT

An I/O device performs data input and data output between the I/O device and first and second computers. An I/O switch relays input and output data between the I/O device and each of the first and second computers. A device emulator emulates the I/O device when a virtual machine running on the first computer and directly accessing the I/O device is migrated from the first computer to the second computer. A connection controller controls switching connection between any one of the first and second computers and any one of the I/O device and the device emulator. The first computer is connected to the I/O device and the second computer is connected to the device emulator until the virtual machine running on the first computer is stopped, and the second computer is connected to the I/O device after the virtual machine running on the first computer is stopped.

6 Claims, 3 Drawing Sheets

SYSTEM FOR MIGRATING A VIRTUAL MACHINE BETWEEN COMPUTERS

CROSS-REFERENCE TO RELATED APPLICATION

This application is based upon and claims the benefit of priority of the prior Japanese Patent Application No. 2011-079786, filed on Mar. 31, 2011, the entire contents of which are incorporated herein by reference.

FIELD

The embodiment is related to a technology for migrating a virtual machine between computers.

BACKGROUND

Virtual machines (VMs) have widely been used in computer systems as one of computer virtualization technologies in recent years. In a virtual machine, the hardware (resource) of a computer is virtualized, and different programs may run on the virtualized hardware. Each virtual machine runs completely independently. Accordingly, use of virtual machines allows a single computer to function as multiple servers. Virtual machines are created by a virtual machine monitor running on the computer. The virtual machine monitor allocates hardware. Through the virtual machine monitor, each virtual machine performs input/output (I/O), that is, accesses the hardware. However, using the virtual machine monitor reduces the speed of access to the hardware and, in particular, the speed of access to an I/O device which is connected to the computer and which receives or outputs data from or to the computer. For this reason, to improve I/O performance, a technology called "direct I/O" that directly allocates I/O devices to virtual machines has recently been implemented as a hardware function. An I/O device used in direct I/O will be hereafter referred to as a "peripheral component interconnect (PCI) device."

In direct I/O, direct DMA (direct memory access) is performed between a virtual machine and a PCI device using direct I/O hardware, which is hardware for performing DMA transfer address conversion (DMA Remapping) between the respective physical address spaces of the virtual machine and the computer. The PCI configuration space related to the setting of the PCI device, a device interrupt, and the like are emulated and reported to the virtual machine by the virtual machine monitor. As a result, the virtual machine may be handled as if an actual PCI device were directly connected thereto.

Virtualization technologies related to virtual machines include a technology called live migration that moves a virtual machine running on a computer to another computer. Live migration is used such as in order to distribute the load in operation management or cope with failures. In live migration, all states of the virtual machine, including the states of the CPU and the hardware register, the memory contents, and the state of I/O transfer, are required to be the same before and after migration.

Generally, live migration may not be performed on a virtual machine using a PCI device by direct I/O because it is common practice that the PCI device being used by the source computer is not connected to the destination computer.

Recently, it has been proposed to use an I/O switch which allows multiple computers to share the connection to a single PCI device (hereafter referred to as a "PCI switch") and to perform live migration of a virtual machine using direct I/O between the computers connected to the PCI switch. "Share" as used herein does not mean that the computers can use the PCI device simultaneously. This means that switching the connection in the PCI switch allows changing a computer to be connected to the PCI device, without changing the physical wiring. With regard to the sharing of a PCI device using a PCI switch, a standard, multi-root I/O virtualization (MR-IOV), is laid down by the PCI-SIG.

The following three steps have been performed conventionally in order to perform live migration of a virtual machine using direct I/O between computers connected to a PCI switch as described above:

(1) Pre-Copy Phase

A non-operating virtual machine is created on the destination computer, and the memory contents of the virtual machine running on the source computer are transferred to the destination computer and then copied to the created virtual machine.

(2) Stop-and-Copy Phase

When the amount of the transferred memory contents exceeds a threshold, the virtual machine running on the source computer is suspended. During the suspension, the remaining memory contents, the memory contents changed after the transfer is started, the CPU state, the state of the emulated hardware, and the like are transferred to the destination computer. Then, in the PCI switch, the PCI device being used using direct I/O is disconnected from the source computer, and then connected to the destination computer, allowing the destination computer to access the PCI device using direct I/O.

(3) Activation Phase

The destination computer incorporates the contents transferred in the Stop-and-Copy phase into the created virtual machine and restarts the virtual machine. The source virtual machine is discarded.

The reason why the source computer and the PCI device are disconnected in the Stop-and-Copy phase is that the same PCI configuration space is not allocated to the multiple computers. Thus, the virtual machine to be migrated is suspended between the time when the source computer and the PCI device are disconnected and the time when the virtual machine is resumed in the destination computer. During this suspension, processes are performed such as hot-plug disconnection or connection of the PCI device from or to the source and destination computers, PCI device configuration by firmware such as BIOS after the disconnection and connection are reported by the PCI switch, and direct I/O setting by the virtual machine monitor. For this reason, while the virtual machine not using direct I/O is suspended for several tens of ms to about 200 ms during live migration, a virtual machine using direct I/O is suspended for another several hundred ms during live migration.

A longer suspension time may cause time-out or the like of a virtual machine used to provide services, reducing service quality. As described above, live migration is often performed such as in order to distribute the load in operation management or cope with failures. In this respect also, it is important to reduce the suspension time associated with live migration of a virtual machine using direct I/O.

Japanese Laid-open Patent Publication Nos. 2010-39685, 2009-181418, 2009-217608 and 2008-46722, International Publication No. WO 2010/116402, and "Intel (R) Virtualization Technology for Directed I/O Architecture Specification Rev 1.2," http://download.intel.com/technology/computing/vptech/Intel(r)_VT_for_Direct_IO.pdf) are examples of related art.

SUMMARY

According to an aspect of the invention, a system includes a first computer in which a first virtual machine is created and a second computer to which the first virtual machine created in the first computer is migrated, an I/O device, and an I/O switch. The I/O device performs data input and data output between the I/O device and each of the first and second computers. The I/O switch relays input and output data between the I/O device and each of the first and second computers. A device emulator is configured to emulate the I/O device when the virtual machine running on the first computer and directly accessing the I/O device is migrated from the first computer to the second computer. A connection controller is configured so that the first computer is connected to the I/O device and the second computer is connected to the device emulator until the virtual machine running on the first computer is stopped, and the second computer is connected to the I/O device after the virtual machine running on the first computer is stopped.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Now, embodiments will be described in detail with reference to the accompanying drawings.

Figure 1:
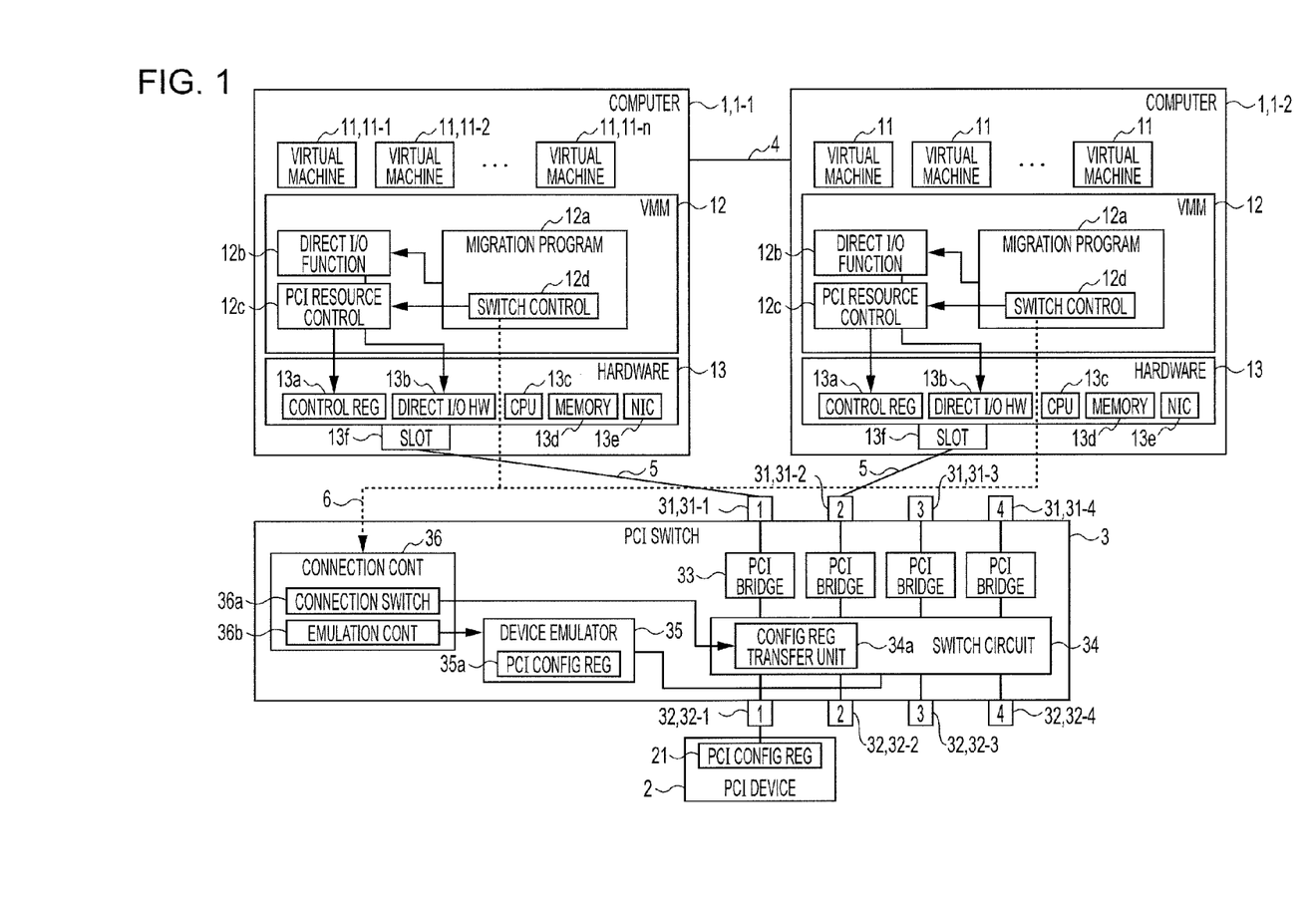
FIG. 1 is a diagram illustrating a configuration example of a computer system, according to an embodiment.

FIG. 1 is a diagram illustrating a configuration example of a computer system, according to an embodiment. For example, the computer system includes two computers (physical computers) 1 (1-1 to 1-2), PCI devices 2 serving as I/O devices, and a PCI switch 3. The PCI switch 3 is an I/O switch for relaying data input/output between the two computers 1 and the PCI devices 2.

The computers 1-1, 1-2 are connected together through a communication channel 4. The PCI switch 3 includes upstream ports 31 for connection with the computers and downstream ports 32 for connection with the PCI devices 2. In FIG. 1, the PCI switch 3 includes four upstream ports, 31-1 to 31-4, and four downstream ports, 32-1 to 32-4. The computers 1-1, 1-2 and the upstream ports 31 are connected together through cables 5.

The PCI switch 3 is connected to the computers 1-1, 1-2 through a PCI switch setup channel 6. The PCI switch setup channel 6 is a communication network such as a local area network (LAN). An I/O switch according to the embodiment is realized as the PCI switch 3.

Created on the computers 1-1, 1-2 are multiple virtual machines 11 (11-1 to 11-n). Virtual machine monitors (abbreviated as "VMMs" in FIG. 1) 12 are programs configured to run on the computers 1-1, 1-2. Each virtual machine monitor 12 constructs multiple virtual hardware environments and creates virtual machines 11 on hardware 13 of the computer 1-1 or computer 1-2 by which the virtual machine monitor 12 is executed, according to an operator instruction (virtual machine definition file). The hardware 13 include a control register (abbreviated as "CONTROL REG" in FIG. 1) 13a, direct I/O hardware (abbreviated as "DIRECT I/O HW" in FIG. 1) 13b, a central processing unit (CPU) 13c, a memory module 13d, a network interface card (abbreviated as "NIC" in FIG. 1) 13e, and a slot 13f. The control register 13a is storing PCI configuration space information indicating an allocated PCI device 2. The direct I/O hardware 13b is used when a virtual machine 11 directly accesses a PCI device 2. The direct I/O hardware 13b accesses the PCI device 2 by referring to the control register 13a. The PCI configuration space information is also being stored in a PCI configuration register (abbreviated as "PCI CONFIG REG" in FIG. 1) 21 of the PCI device 2.

The virtual machine monitor 12 has a direct I/O function 12b and a PCI resource control 12c. The direct I/O function 12b supports direct I/O, that is, supports access to the PCI device 2 made using the direct I/O hardware 13b. The PCI resource control 12c controls the resource (address space) of a PCI device 2 allocated to each virtual machine 11. The direct I/O function 12b and the PCI resource control 12c may be implemented as sub-programs included in each virtual machine monitor 12.

Each virtual machine monitor 12 supports live migration of a virtual machine 11 using direct I/O. A migration program 12a of each virtual machine monitor 12 is a sub-program for performing live migration and includes a switch control 12d as a sub-program. The switch control 12d is intended to control the PCI switch 3 when performing live migration of a virtual machine 1 using direct I/O. Details of the control will be described later.

The PCI switch 3 includes the four upstream ports 31 and the four downstream ports 32, as well as PCI bridges 33 provided for the respective downstream ports 32, a switch circuit 34 disposed between the PCI bridges 33 and the downstream ports 32, a device emulator 35, and a connection controller (abbreviated as "CONNECTION CONT" in FIG. 1) 36.

Each PCI bridge 33 relays data transmission/reception through the corresponding upstream port 31. The switch circuit 34 is a circuit that may arbitrarily switch the connections between the PCI bridges 33 (upstream ports 31) and the downstream ports 32. The device emulator 35 emulates a PCI device 2 connected to any downstream port 32. To emulate a PCI device 2, the device emulator 35 includes a PCI configuration register 35a. A configuration register transfer unit (abbreviated as "CONFIG REG TRANSFER UNIT" in FIG. 1) 34a of the switch circuit 34 obtains, from the PCI device 2, PCI configuration space information to be stored in the PCI configuration register 35a and outputs it to the device emulator 35.

The connection controller 36 controls the connections between the PCI bridges 33 (upstream ports 31) in the switch circuit 34 and the downstream ports 32 in the PCI switch 3 and controls the device emulator 35. For this reason, the connection controller 36 includes a connection switch 36a and an emulation controller (abbreviated as "EMULATION CONT" in FIG. 1) 36b.

Figure 2:
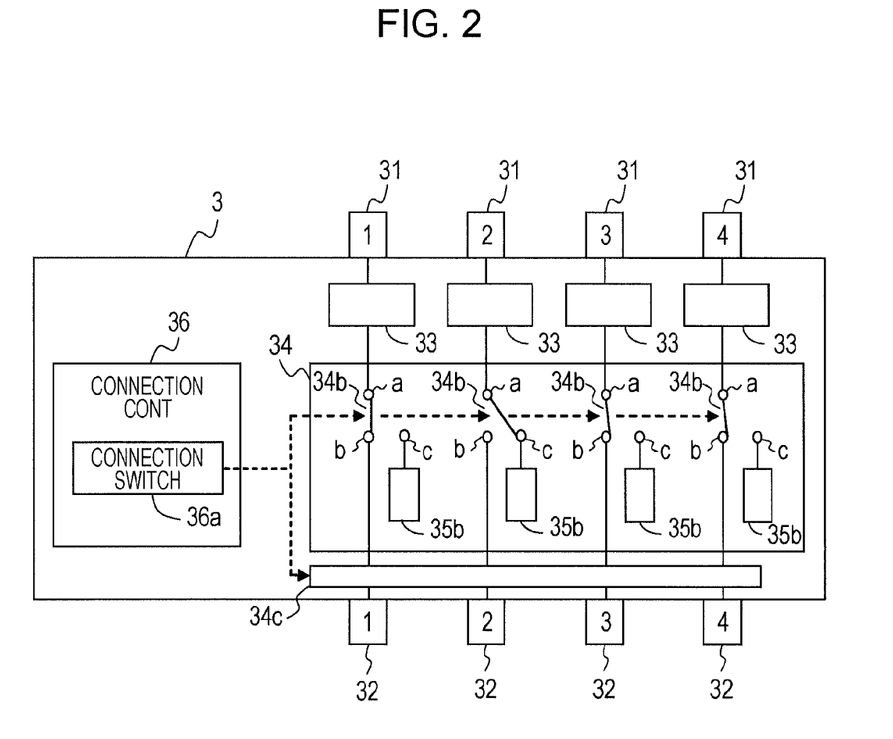
FIG. 2 is a diagram illustrating an example of operations of an I/O switch, according to an embodiment.

FIG. 2 is a diagram illustrating an example of operations of an I/O switch, according to an embodiment. FIG. 2 illustrates operations of a device emulator 35, a switch circuit 34, and a connection switch 36a. Referring to FIG. 2, the operations of the device emulator 35, the switch circuit 34, and the connection switch 36a will be described in detail.

As illustrated in FIG. 2, the switch circuit 34 includes switches 34b each having contact a connected to the corresponding PCI bridge 33. In each switch 34b, the contact a is connected to one of contacts b and c. The contact b is connected to a switch 34c. The switch 34c connects each switch 34b to a downstream port 32 to which the switch 34b is to be connected. Thus, in a state where the contacts a and b of each switch 34b are connected, the connections between the upstream ports 31 and the downstream ports 32 are controlled by the switch 34c.

Connected to the contacts c of the switches 34b are emulators 35b. Each emulator 35b is a pseudo-PCI device provided by the device emulator 35. Each emulator 35b emulates a PCI device 2 connected to a downstream port 32 to which the contact b of a switch 34b having the contact c thereof connected to the emulator 35b is connected by the switch 34c.

The emulation controller 36b of the connection controller 36 transmits, to the device emulator 35, information indicating whether to run the emulator 35b connected to the contact c of each switch 34b as well as information identifying PCI devices 2 to be emulated. The device emulator 35 then emulates a PCI device 2 to be emulated with respect to each switch 34b.

The connection switch 36a of the connection controller 36 sets the connections in the switch 34c, as well as switches the contact to which the contact a of each switch 34b is to be connected. This switching is performed for each switch 34b in accordance with an instruction made to the device emulator 35 by the emulation controller 36b.

The device emulator 35 makes such emulation in order to perform live migration of the virtual machine 11 that uses the direct I/O hardware 13b. For example, assume that the computer 1-1 is a source computer on which a virtual machine 11 to be migrated is running and the computer 1-2 is a destination computer and that the virtual machine 11 is accessing the PCI device connected to the downstream port 32-1 of the PCI switch 3 using the direct I/O hardware 13b, as illustrated in FIG. 1. In this assumption, the connection switch 36a of the connection controller 36 connects the contact a of a switch 34b that is connected to the PCI bridge 33 of the upstream port 31-1, to the contact b thereof. The connection switch unit 36a also connects the contact a of a switch 34b connected to the PCI bridge 33 of the upstream port 31-2, to the contact c thereof (as depicted in FIG. 2). The emulation controller 36b of the connection controller 36 selects a PCI device 2 to be emulated from among the PCI devices 2 connected to the downstream ports 32 and causes the device emulator 35 to emulate the selected PCI device 2. This allows the computer 1-1 to access the PCI device 2, as well as allows the computer 1-2 to communicate with the emulated PCI device 2.

Thus, in the embodiment, before suspending the virtual machine 11 that is running on the source computer 1 and is to be migrated, a hot-plug process of connecting the virtual machine 11 created on the destination computer 1 to the PCI device 2 may be completed. Configuration of the PCI device 2 on the destination computer 1 and setting of the direct I/O hardware 13b by the virtual machine monitor 12 are also completed before suspending the virtual machine 11 running on the migration source 1. As a result, the suspension time of the virtual machine 11 to be migrated may be reduced significantly compared to that of conventional computer systems, which perform these processes after suspending the virtual machine 11 running on the source computer 1.

To perform live migration as described above, the PCI switch 3 according to the embodiment are provided with a function of emulating the PCI devices 2 (device emulator 35, emulation controller 36b) and a function of switching the connection between the emulating function and the PCI devices 2 (switch circuit 34, connection switch 36a). Thus, the PCI switch 3 provides, to the computer 1 serving as the destination of the virtual machine 11 using direct I/O, an environment that allows the destination computer 1 to connect with the PCI device 2 which the virtual machine 11 is directly accessing. For example, the configuration register transfer unit 34a transfers configuration information that was set in the PCI configuration register 35a by the destination computer 1, to the PCI configuration register 21. Providing these functions to the PCI switch 3 reduces traffic between the apparatuses, thereby reducing the suspension time of the virtual machine as well as the time for live migration.

The above-mentioned live migration may be realized by the migration program 12a of the virtual machine monitor 12 installed on each of the source and the destination computers 1. The operation of the connection switch 36a and the emulation controller 36b of the connection controller 36 is performed by the switch control 12d of the migration program 12a installed on the source computer 1. For this purpose, the switch control 12d transmits, to the PCI switch 3, information such as information identifying a PCI device 2 to be emulated and information identifying the destination computer 1.

Figure 3:
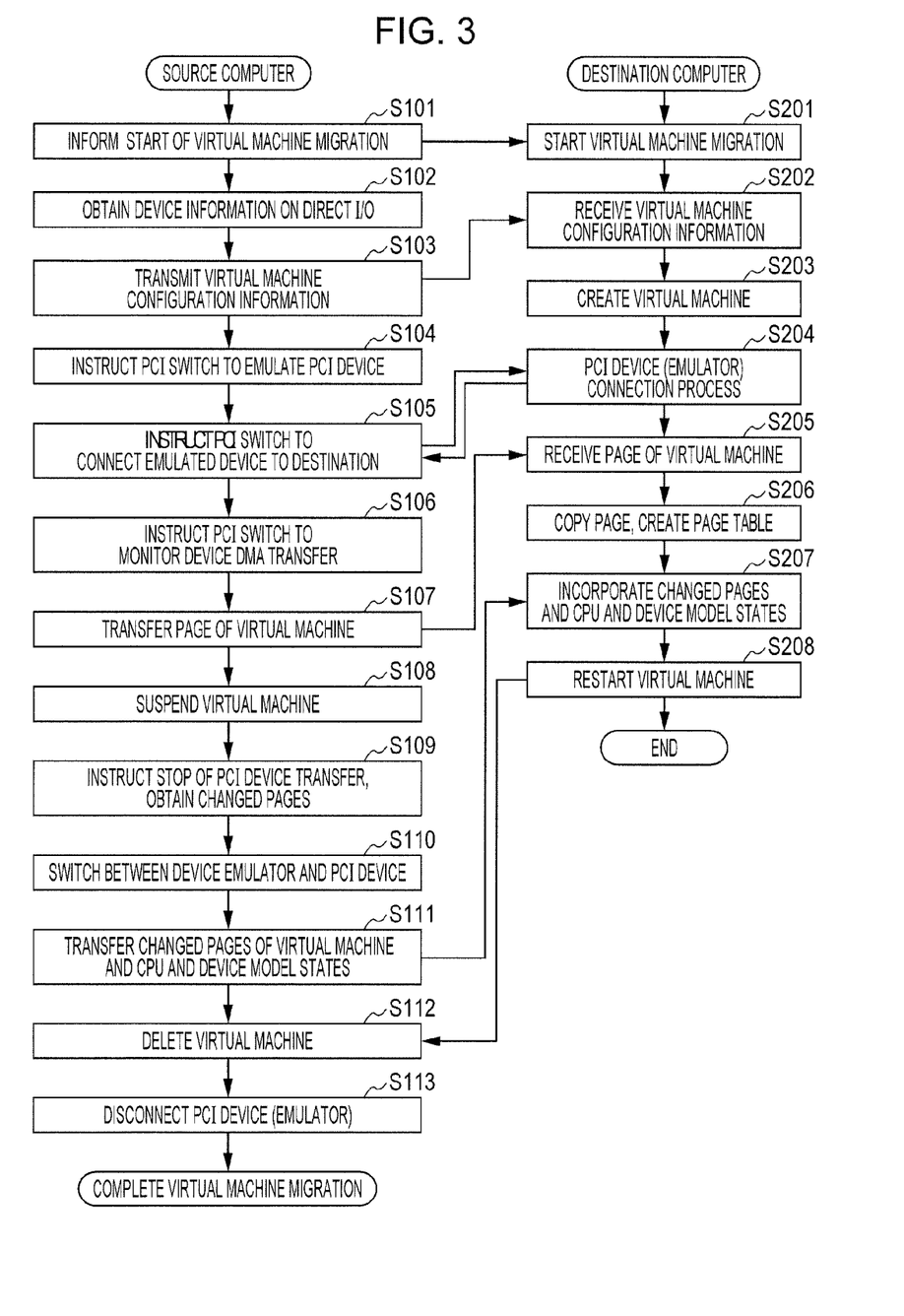
FIG. 3 is a diagram illustrating an example of an operational flowchart for performing live migration of a virtual machine using a direct I/O device, according to an embodiment.

FIG. 3 is a diagram illustrating an example of an operational flowchart for performing live migration of a virtual machine using a direct I/O hardware, according to an embodiment. The operational flowchart depicted in FIG. 3 may be, for example, performed by the source and destination computers 1 when performing live migration of a virtual machine using the direct I/O hardware 13b. Referring now to FIG. 3, the processes performed by the source and destination computers 1 will be described in detail. The operational flowchart illustrated in FIG. 3 is performed by the source and destination computers 1 when one or more CPUs 13c included in each computer execute the virtual machine monitor 12.

To facilitate the understanding of the processes illustrated in the operational flowchart of FIG. 3, it is assumed that the computer 1-1 is a source computer on which a virtual machine 11 to be migrated is running and the computer 1-2 is a destination computer to which the virtual machine is migrated. It is also assumed that the PCI device 2 being directly accessed by the virtual machine 11 is connected to the downstream port 32-1 of the PCI switch 3 and that the computers 1-1, 1-2 are connected to the upstream ports 31-1, 31-2, respectively, of the PCI switch 3, as depicted in FIG. 1.

In operation S101 of the source computer, the virtual machine monitor 12 of the computer 1-1 starts the migration program 12a in accordance with an instruction for live migration from the operator. The started migration program 12a transmits information indicating the start of migration of the virtual machine 11, to the destination computer 1-2 through the communication channel 4.

In operation S201 of the destination computer, upon receiving the information indicating the start of migration of a virtual machine 11, the virtual machine monitor 12 of the destination computer 1-2 starts the migration program 12a.

In operation S102 of the source computer, the migration program 12a of the computer 1-1, which has transmitted the information indicating the start of migration of the virtual machine 11, obtains device information such as information about the PCI device 2 being directly accessed by the virtual machine 11 to be migrated (described as "DEVICE INFORMATION" in FIG. 3).

In operation S103, the migration program 12a transmits virtual machine configuration information, such as the obtained device information, the amount of memory used by the virtual machine 11, and the contents of the definition file of the virtual machine 11, to the destination computer 1-2 through the communication channel 4.

In operation S202 of the destination computer, the migration program 12a of the computer 1-2 receives the virtual machine configuration information from the computer 1-1.

In operation S203, the migration program 12a creates a virtual machine that serves, on the computer 1-2, as the virtual machine 11 to be migrated. Hereinafter, the created virtual machine will be also expressed as "the virtual machine 11". The created virtual machine 11 is placed in a non-operating state.

In operation S104 of the source computer, the migration program 12a of the computer 1-1 instructs, through the PCI switch setup channel 6, the PCI switch 3 to emulate the PCI device 2.

In operation S105, the migration program 12a instructs the PCI switch 3 to connect the emulated PCI device 2 to the destination computer 1-2. These instructions are made by the switch control 12d. After making the instructions, the migration program 12a instructs, through the communication channel 4, the destination computer 1-2 to connect with the PCI device 2.

In operation S204 of the destination computer, in accordance with the instruction from the source computer 1-1, the connection controller 36 of the PCI switch 3 causes the device emulator 35 to start emulating the PCI device 2. The connection controller 36 then controls the switch 34b having the contact a thereof connected to the PCI bridge 33 of the upstream port 31-2 so that the contact a of the switch 34b is connected to the contact c thereof. Before starting the emulation, the device emulator 35 obtains the PCI configuration space information of the PCI device 2 from the configuration register transfer unit 34a of the switch circuit 34 and stores the obtained PCI configuration space information in the PCI configuration register 35a. The start of the emulation and the control of the switch 34b allow the emulated PCI device 2 and the destination computer 1-2 to communicate with each other. Subsequently, the migration program 12a of the destination computer 1-2 causes the source computer 1-2 to access the PCI device 2 through the cable 5 and performs a connection process. This connection process includes the above-mentioned hot-plug process, configuration of the PCI device 2, and setting of the direct I/O hardware 13b. After performing such a connection process, the migration program 12a of the destination computer 1-2 transmits information indicating that the connection is complete to the source computer 1-1.

The virtual machine 11 created on the destination computer 1-2 is not operated yet at a time when the connection process is performed. For this reason, the emulated PCI device 2 is not accessed by a device driver on the guest operating system (OS) of the virtual machine 11. As a result, the migration program 12a of the destination computer 1-2 may perform the connection process regardless whether the PCI device 2 on which the connection process is performed is an emulated one or not.

Returning to operation S105 of the source computer, the migration program 12a of the source computer 1-1 receives the information indicating that the connection is complete from the destination computer 1-2. Then, to record the state of the virtual machine 11 running on the source computer 1-1, the migration program 12a starts changing the page table of the virtual machine 11 and monitoring I/O transfer of a device model for emulating the hardware function of the virtual machine 11.

In operation S106 of the source computer, the migration program 12a instructs the PCI switch 3 to monitor the DMA transfer that is being performed using direct I/O between the destination computer 1-2 and the PCI device 2. These processes are performed using known technologies. Such monitoring may be performed before receiving the information indicating that the connection is complete from the destination computer 1-2.

In operation S107, after starting such monitoring, the migration program 12a of the source computer 1-1 transfers the memory contents (page) of the virtual machine 11 to the destination computer 1-2.

In operation S205 of the destination computer, the migration program 12a of the destination computer 1-2 receives the transferred page, In operation S206, and the migration program 12a copies the received page to the memory space of the created virtual machine 11 to create a page table of the virtual machine 11.

In the case, pages are repeatedly transferred by the migration program 12a of the source computer 1-1 until the amount of transferred pages exceeds a given amount. Each transferred page is handled by the migration program 12a of the destination computer 1-2.

In operation S108 of the source computer, when the amount of memory transfer exceeds the given amount, the migration program 12a of the source computer 1-1 suspends the virtual machine to be migrate.

In operation S109, the migration program 12a instructs the PCI switch 3 to stop the DMA transfer between the PCI device 2 and the source computer 1-1, and obtains from the PCI switch 3 a list of pages that have so far been changed due to the DMA transfer between the PCI device 2 and the source computer 1-1.

In operation S110, the switch control 12d of the migration program 12a instructs the PCI switch 3 to switch between the device emulator 35 and the PCI device 2.

In accordance with the instruction from the switch control 12d, the connection switch 36a of the connection controller 36 of the PCI switch 3 controls the switch 34b having the contact a thereof connected to the PCI bridge 33 of the upstream port 31-1 in the switch circuit 34 so that the contact a of the switch 34b is connected to the contact c thereof. Further, the connection switch 36a controls the switch 34b having the contact a thereof connected to the PCI bridge 33 of the upstream port 31-2 so that the contact a of the switch 34b is connected to the contact b thereof, and then controls the switch 34c so that the contact b is connected to the downstream port 32-1. As a result, the source computer 1-1 is connected to the device emulator 35 of the PCI switch 3, whereas the destination computer 1-2 is connected to the PCI device 2 through the PCI switch 3. In this switching, the PCI switch 3 transmits no information indicating the connection or disconnection of the PCI device 2, to the destination computer 1-2. Therefore, the destination computer 1-2 does not recognize the switching and rather recognizes that the PCI device 2 is continuously connected to the destination computer 1-2.

In operation S111, after the switching process is performed by the PCI switch 3, the migration program 12a of the source computer 1-1 transmits to the destination computer 1-2 the changed pages as well as the respective states of the CPU 13c and the device model that are obtained through the above-mentioned monitoring.

In operation S207 of the destination computer, the migration program 12a of the destination computer 1-2 receives the changed pages and the states of the CPU 13c and the device model, and incorporates these pieces of information into the created virtual machine 11.

In operation S208, the migration program 12a regards these pieces of information as information indicating that the PCI switch 3 has completed the connection switching, restarts the created virtual machine 11, and transmits information indicating the restart of the virtual machine 11 to the source computer 1-1.

The destination computer 1-2 is already connected to the PCI device 2 through the PCI switch 3 at a time when the destination computer 1-2 restarts the virtual machine 11. Thus, the virtual machine 11 on the destination computer 1-2 may access the PCI device 2 using direct I/O in the similar manner as the virtual machine 11 on the source computer 1-1. The migration program 12a of the destination computer 1-2 then completes the process related to the migration of the virtual machine 11 by transmitting information indicating the restart of the virtual machine 11 to the source computer 1-1.

In operation S112 of the source computer, upon receiving the information indicating the restart of the virtual machine 11 from the destination computer 1-2, the migration program 12a of the source computer 1-1 deletes the virtual machine 11 that has been migrated.

In operation S113, the switch control 12d of the migration program 12a instructs the PCI switch 3 to disconnect the source computer 1-1 from the device emulator 35 so as to complete the emulation of the PCI device 2. After the above disconnection process is performed by the PCI switch 3, the migration program 12a of the source computer 1-1 completes the process related to the migration of the virtual machine 11.

Upon receiving the instruction from the switch control 12d, the emulation controller 36b of the connection controller 36 of the PCI switch 3 causes the device emulator 35 to complete the emulation. Since the computer 1-1 is connected to the device emulator 35 at this point, control is not performed on the switch 34b connected to the computer 1-1 and the switch 34c of the switch circuit 34. For this reason, it is unnecessary to operate the connection switch 36a.

While the connection controller 36 and the device emulator 35 are included in the PCI switch 3 in this embodiment, at least one of the connection controller 36 and the device emulator 35 may be included in an apparatus different from the PCI switch 3 in the computer system. Further, an apparatus different from the computers 1-1, 1-2 may control live migration and make instructions to the PCI switch 3. In this way, various modifications may be made to the embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A system for migrating a virtual machine between computers, the system comprising:
   a first computer in which a first virtual machine is created;
   a second computer to which the first virtual machine created in the first computer is migrated;
   an I/O device to perform data input and data output between the I/O device and each of the first and second computers; and
   an I/O switch to relay input and output data between the I/O device and each of the first and second computers, wherein
   a device emulator is configured to emulate the I/O device while the virtual machine running on the first computer and directly accessing the I/O device is migrated from the first computer to the second computer; and
   a connection controller is configured so that
      the first computer is connected to the I/O device and the second computer is connected to the device emulator until the virtual machine running on the first computer is stopped, and
      the second computer is connected to the I/O device after the virtual machine running on the first computer is stopped, wherein
      after the device emulator and the connection controller are configured, the first computer connects the second computer to the device emulator when the second computer is in a state in which a second virtual machine is created as a virtual machine that is migrated from the first virtual machine and an operation of the created second virtual machine is suspended.

2. The system of claim 1, wherein
the device emulator and the connection controller are configured with the I/O switch under control of the first computer.

3. The system of claim 1, wherein
the device emulator reduces the suspension time of the virtual machine.

4. An I/O switch apparatus connectable to a plurality of computers and a plurality of I/O devices and to relay input and output data between the plurality of computers and the plurality of I/O devices, the apparatus comprising:
   a device emulator to emulate a designated one of the plurality of I/O devices while a first virtual machine running on a first computer and directly accessing the I/O device is migrated from the first computer to a second computer;
   a switching controller to switch a connection destination of each of the plurality of computers between the device emulator and the I/O device being emulated by the device emulator; and having
   a connection controller, wherein
      after the device emulator and the connection controller are configured, the first computer connects the second computer to the device emulator when the second computer is in a state in which a second virtual machine is created as a virtual machine that is migrated from the first virtual machine and an operation of the created second virtual machine is suspended.

5. The apparatus of claim 4, wherein
the device emulator reduces the suspension time of the virtual machine while the virtual machine running on the first computer and directly accessing the I/O device is migrated from the first computer to the second computer.

6. A system for migrating a virtual machine between computers, the system comprising:
   an I/O device;
   a first computer including a first I/O port to be connected to the I/O device;
   a second computer including a second I/O port to be connected to the I/O device; and an I/O switch connected to the first and second I/O ports, the I/O switch being configured to switch connection between any one of the first and second I/O ports and the I/O device connected to the I/O switch, the I/O device including a configuration register to hold address information that is set for performing direct memory access (DMA) transfer, the I/O switch including:
a configuration register transfer unit to:
acquire configuration space information from the configuration register, and
transfer, to the configuration register, address information that is set based on the acquired configuration space information, and
a device emulator to:
connect with a connection destination computer that is one of the first and second computers to which the I/O switch is to be connected,
emulate the I/O device based on the acquired configuration space information, and
acquire the address information that is set by the connection destination computer, wherein
the I/O switch acquires the configuration space information of the I/O device by connecting the I/O device to the configuration register transfer unit;
the I/O switch acquires the address information that is set by the second computer, by connecting the second computer to the device emulator;
the I/O switch transfers the acquired address information to the configuration register of the I/O device, by connecting the I/O device to the configuration register transfer unit; and
the I/O switch switches a connection destination of the second computer from the device emulator to the I/O device to which the acquired address information has been transferred.

* * * * *

UNITED STATES PATENT AND TRADEMARK OFFICE
CERTIFICATE OF CORRECTION

| | | |
|---|---|---|
| PATENT NO. | : 8,966,480 B2 | Page 1 of 1 |
| APPLICATION NO. | : 13/431017 | |
| DATED | : February 24, 2015 | |
| INVENTOR(S) | : Noboru Iwamatsu et al. | |

It is certified that error appears in the above-identified patent and that said Letters Patent is hereby corrected as shown below:

In the claims

Column 10, Line 46, In Claim 4, delete "and having" and insert -- and --, therefor.

Signed and Sealed this
Fourteenth Day of July, 2015

Michelle K. Lee
*Director of the United States Patent and Trademark Office*